July 3, 1945. W. O. SJOGREN Re. 22,655

CYLINDER COVERING MECHANISM

Original Filed May 1, 1943 2 Sheets-Sheet 1

Inventor.
Walter O. Sjogren.
Chas. P. Howley
Attorney.

July 3, 1945. W. O. SJOGREN Re. 22,655

CYLINDER COVERING MECHANISM

Original Filed May 1, 1943 2 Sheets-Sheet 2

Inventor
Walter O. Sjogren.
Chas. H. Hauf
Attorney.

Reissued July 3, 1945

Re. 22,655

UNITED STATES PATENT OFFICE 22,655

CYLINDER COVERING MECHANISM

Walter O. Sjogren, Worcester, Mass.

Original No. 2,334,357, dated November 16, 1943, Serial No. 485,389, May 1, 1943. Application for reissue December 7, 1944, Serial No. 567,003

7 Claims. (Cl. 74—16)

This invention relates to the application of card clothing to the surfaces of drums, cylinders or rollers as used in cotton or wool cards or for other similar purposes.

The card clothing for such cylinders is supplied in long, narrow belt-like strips and is helically wound on the cylinder under heavy and continuous tension. In the usual practice, this tension may be on the order of 300 to 400 pounds. It has been the regular procedure to turn the cylinder manually against this heavy tension, with unavoidable delays and substantial variations in both speed and tension.

It is the general object of my invention to eliminate this slow and expensive manual operation of covering mechanism, and to provide power means to turn the cylinder or drum continuously and at a uniform rate of speed, and which power means is not markedly responsive to adjustment of covering tension.

To the accomplishment of this general object, one feature of the invention relates to the provision of convenient and effective power means for rotating the drum and feeding the tension device in timed relation and both from the same motor-driven worm shaft. A further feature relates to a novel construction by which the mechanism may be conveniently attached at either end of a cylinder shaft. I have also provided novel means for supporting the driving unit in either of two vertically reversed positions.

My invention further relates to arrangements and combinations of parts which will be hereinafter described and more particularly pointed out in the appended claims.

A preferred form of the invention is shown in the drawings, in which

Figure 1:
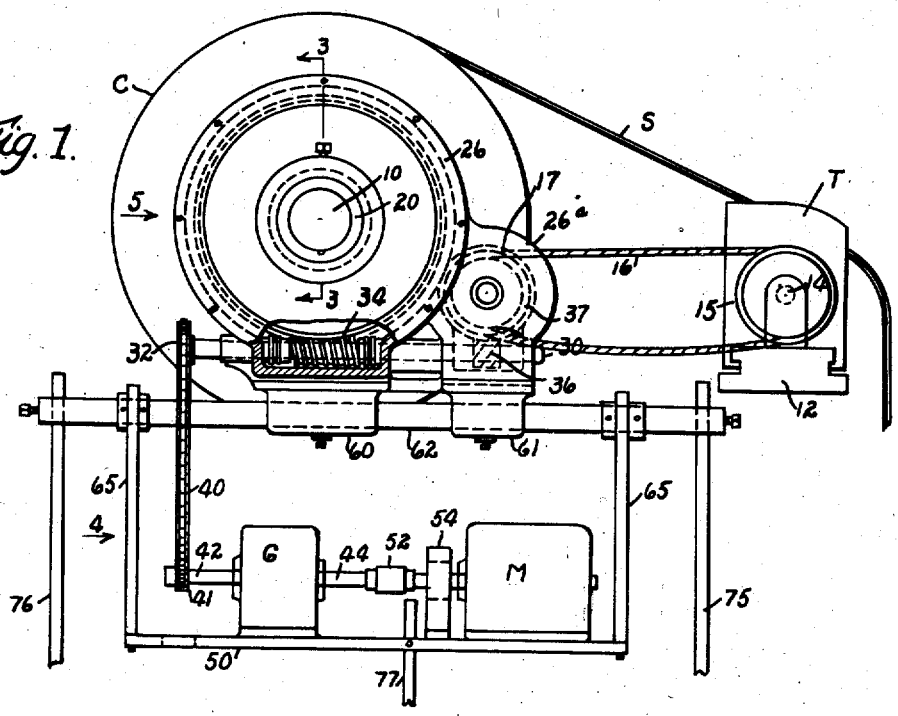
Fig. 1 is a side elevation of my improved roll-covering mechanism.

Referring to the drawings, I have shown a cylinder or drum C (Fig. 1) having a drive shaft 10 and assumed to be mounted in and to form a part of a cotton or wool card. A strip of card clothing is indicated at S and a usual commercial tension device is indicated at T. The tension device is slidable transversely of the card on a fixed guide-way or frame 12 and is moved transversely by a feed screw 14 having a sprocket 15 connected by a chain 16 to a sprocket 17 forming part of my improved covering mechanism which will now be described.

Figure 3:
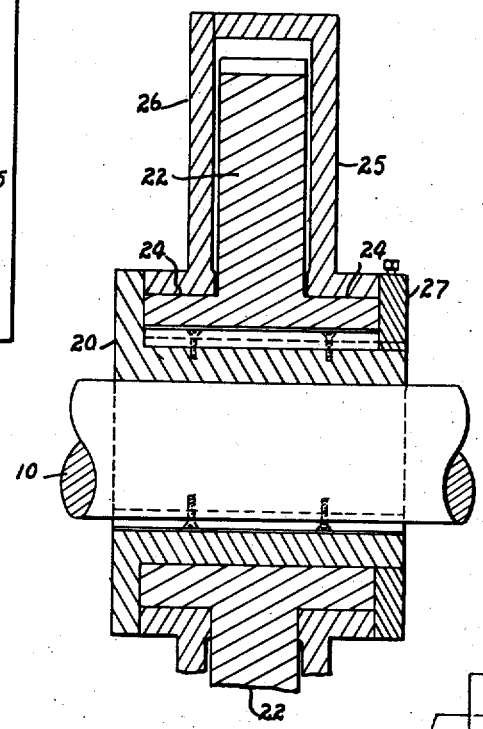
Fig. 3 is an enlarged partial sectional elevation, taken along the line 3—3 in Fig. 1.
Figure 5:
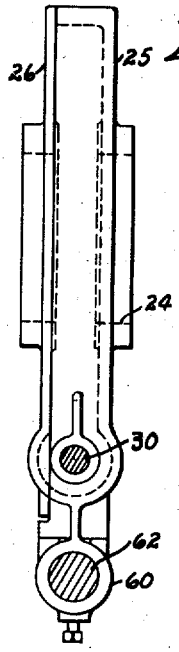
Fig. 5 is an enlarged edge view of certain parts, looking in the direction of the arrow 5 in Fig. 1.

I first provide an adaptor bushing 20 (Fig. 3) which is keyed to the cylinder shaft 10 and which supports a relatively large worm gear 22. The gear 22 is keyed to the bushing 20, so that the worm gear is effective to turn the cylinder shaft 10 and cylinder C. The worm gear 22 rotates in bearings 24 in a gear casing 25 having a cover 26, and the parts are held in assembled relation by a collar 27.

A worm shaft 30 (Fig. 1) is mounted in bearings in the casing 24 below the worm gear 22 and is provided with a sprocket 32 at one end and with a worm 34 engaging the worm gear 22. The worm shaft 30 is also provided with a second worm 36 (Fig. 1) engaging a second worm gear 37 rotatable with the sprocket 17 and through which it drives the feed shaft 14 of the tension device T. The sprocket 32 on the worm shaft 30 is connected by a chain 40 to a small sprocket 41 on a shaft 42, which is the output shaft of a speed-reducing gear box G.

The gear box G is mounted on a base plate 50, which also supports a motor M connected to the shaft 44 through a coupling 52. A magnetic brake 54 is also preferably mounted on the plate 50 and operates to effect abrupt stopping of the motor M.

The tension device T, gear box G, the motor M and the magnetic brake 54 may all be of usual commercial constructions, it being essential, however, that the motor M have a strong starting torque. Any usual manual control may be provided for the motor M.

Figure 6:
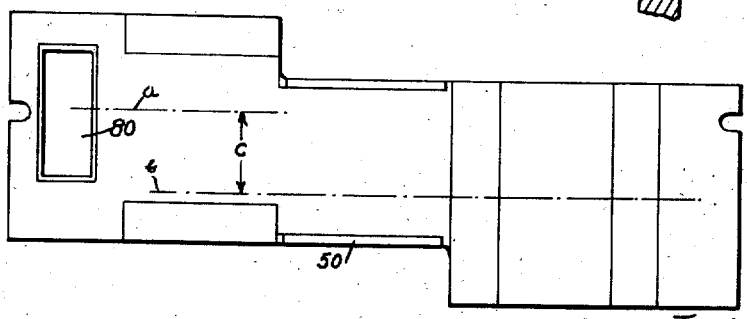
Fig. 6 is an enlarged plan view of the base plate which supports the driving unit.

The transverse position of the output shaft 42 of the gear box G is indicated by the center line *a* in Fig. 6 and the position of the intake shaft 44 is indicated by the center line *b*, these two shafts being offset by a distance *c*. The motor M is mounted on the center line *b* (Fig. 6) and is thus substantially out of alignment with the axis of the shaft 42 which drives the worm shaft 30.

The casing 26 (Fig. 1) for the worm gear 22 and the casing extension 26a for the worm gear 37 are provided with downward extensions 60 and 61 to receive a supporting shaft 62, along which they may be slidably adjusted and to which they may be secured by set-screws or in any other convenient way.

Figure 4:
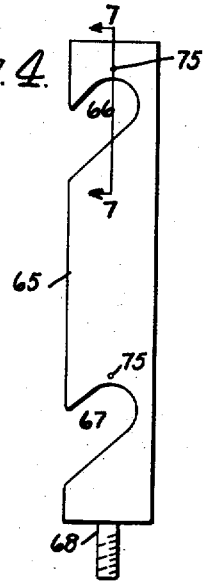
Fig. 4 is an enlarged side elevation of a hanger, looking in the direction of the arrow 4 in Fig. 1.

The base plate 50 is suspended from the supporting shaft 62 by hangers 65 (Figs. 1 and 4). Each hanger 65 is provided with an inclined upper notch 66 (Fig. 4) and with an inclined lower notch 67, and also with a stud 68 by which it may be secured to the base plate 50.

Figure 7:
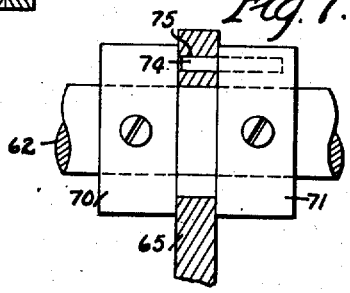
Fig. 7 is an enlarged side elevation of certain parts with a portion of a hanger shown in section on the line 7—7 in Fig. 4.

When the parts are in the position shown in Fig. 1, the hangers 65 have their upper notches 66 engaged with the supporting shaft 62, the hangers being held from axial displacement on the shaft by collars 70 and 71 (Fig. 7). Each collar 71 has a stud 74 adapted to extend into a small hole 75 (Fig. 4) above a notch 66 or 67 of each hanger and thus prevent upward or angular displacement of the hangers when power is applied to turn the cylinder C.

When the parts are in the position shown in Fig. 1, the motor M is substantially displaced toward the observer and will not interfere with the mounting of the worm gear 22 and its casing 24 on the end of the cylinder shaft 10 and in reasonably close relation to the drum or cylinder C. If, however, it should be necessary or desirable to mount the worm gear on the opposite end of the cylinder shaft 10, the position of the motor M would prevent any such close association of the parts, by reason of its offset position.

Figure 2:
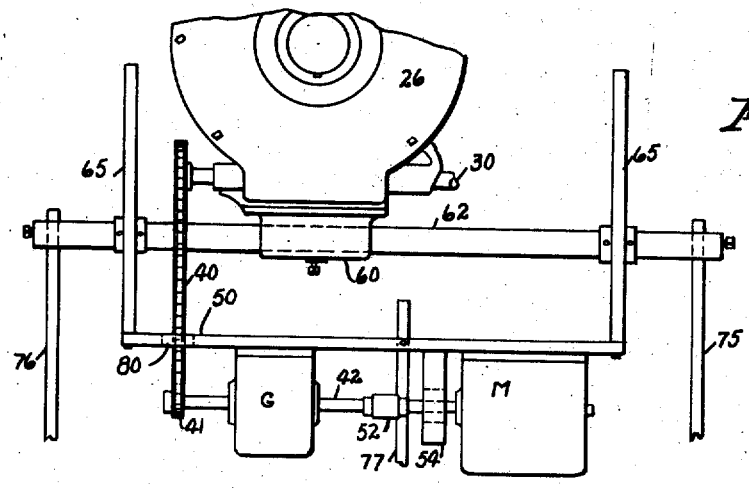
Fig. 2 is a view similar to Fig. 1 but showing the driving unit vertically reversed.

To avoid this difficulty, I arrange the parts in the reversed position shown in Fig. 2, in which position the base plate 50 and the driving unit parts mounted thereon are all inverted. The hangers 65 are also removed and reversed with respect to the plate 50.

I then use the lower notches 67 in the hangers 65 for engagement with the supporting shaft 62. The notches 66 and 67 are so spaced apart that the distances between the worm shaft 30 and the power output shaft 42 will be the same, whether the driving unit is upright or inverted.

Brace rods 75 and 76 are clamped in the opposite ends of the supporting shaft 62 and extend downward to engage the floor or any other available supporting surface. A similar brace rod 77 extends through and may be secured to the base plate 50. Different adapter bushings permit convenient attachment of the mechanism to cylinder shafts of different diameters.

Having described the details of construction of my improved covering mechanism, it will be seen that the mechanism is simple and reliable; that it may be readily attached to a cylinder shaft for either a right-hand or a left-hand drive; that continuous power and uniform speed is provided for the cylinder C; and that a similarly continuous and uniform speed is provided for the feed shaft of the tension device T. It will also be noted that the rate of rotation of the cylinder C and the rate of rotation of the feed shaft 14 are in a fixed and predetermined speed relation. An opening 80 in the base plate 50 allows passage of the chain 40 when the driving unit is inverted.

By the use of my improved covering mechanism, the time required to cover a cylinder is substantially reduced, and furthermore the services of the two men required to turn the cylinder manually are eliminated, as is also much lost time due to fatigue. Furthermore, both the speed and the tension are much more uniform and consequently the card clothing is applied in such manner as to give improved service.

Having thus described my invention and the advantages thereof, I do not wish to be limited to the details herein disclosed, otherwise than as set forth in the claims, but what I claim is:

1. In a covering mechanism for a cylinder having a cylinder shaft, in combination, a worm gear attachable to either end of said cylinder shaft, a worm for said gear, a worm shaft for said worm, a power driving unit, a driving connection between said driving unit and said worm shaft, and means to support said driving unit in either upright or reversed positions, said driving connection being fully operative and said driving unit being equally effective in both of said positions.

2. The combination in a covering mechanism as set forth in claim 1, in which the driving unit is mounted on a reversible base plate, and in which hangers connect said plate to a supporting shaft and automatically position said plate at different predetermined distances therefrom.

3. The combination in a covering mechanism as set forth in claim 1, in which the driving unit is mounted on a reversible base plate and includes a driving shaft, and in which hangers connect said plate to a supporting shaft and automatically position said plate to keep the axial spacing between said driving shaft and said worm shaft constant in either the upright or the reversed position of said driving unit.

4. The combination in a covering mechanism as set forth in claim 1, in which the driving unit includes a gear box having transversely offset intake and output shafts, a driving motor aligned with said intake shaft, and a base plate on which said gear box and motor are assembled as a driving unit, said assembled base plate and driving unit being vertically reversible for operative attachment to either end of a cylinder shaft.

5. The combination in a covering mechanism as set forth in claim 1, in which the driving unit is mounted on a reversible base plate, and in which hangers connect said plate to a supporting shaft, and in which means is provided to prevent vertical or angular displacement of said hangers about said supporting shaft.

6. The combination in a covering mechanism as set forth in claim 1, in which the driving unit includes a gear box having transversely offset intake and output shafts, a driving motor aligned with said intake shaft, a base plate on which said gear box and motor are assembled as a driving unit, and a magnetic brake for said driving motor mounted on said base plate.

7. In a covering mechanism for a cylinder having a cylinder shaft, in combination, a worm gear attachable to said cylinder shaft, a worm for said worm gear, a worm shaft for said worm, a power driving unit, a driving connection between said power driving unit and said worm shaft, a base plate on which said power driving unit is mounted, a supporting shaft secured in said covering mechanism and positioned below said worm shaft, spaced hangers suspending said base plate from said supporting shaft at a predetermined distance below said shaft, and coacting parts on said hangers and supporting shaft effective to prevent both axial and vertical displacement of said hangers relative to said shaft, said coacting parts comprising a pair of collars on said supporting shaft embracing each hanger to prevent axial displacement thereof, and means engageable by relative axial sliding movement of one of each pair of collars and its associated hanger to prevent vertical displacement thereof.

WALTER O. SJOGREN.